(12) United States Patent
Chang et al.

(10) Patent No.: US 12,407,417 B2
(45) Date of Patent: Sep. 2, 2025

(54) METHOD AND APPARATUS FOR OPTIMIZING PERFORMANCE OF OPTICAL TRANSCEIVER

(71) Applicant: ELECTRONICS AND TELECOMMUNICATIONS RESEARCH INSTITUTE, Daejeon (KR)

(72) Inventors: Sun Hyok Chang, Daejeon (KR); Hun Sik Kang, Daejeon (KR); In Ki Hwang, Daejeon (KR); Seung Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 142 days.

(21) Appl. No.: 18/105,087

(22) Filed: Feb. 2, 2023

(65) Prior Publication Data

US 2023/0299853 A1 Sep. 21, 2023

(30) Foreign Application Priority Data

Mar. 15, 2022 (KR) .................. 10-2022-0032351

(51) Int. Cl.
*H04B 10/40* (2013.01)
*H04L 7/00* (2006.01)
(Continued)

(52) U.S. Cl.
CPC ........... *H04B 10/40* (2013.01); *H04L 7/0016* (2013.01); *H04L 7/02* (2013.01); *H04B 10/07* (2013.01);
(Continued)

(58) Field of Classification Search
CPC .................. H04B 10/40; H04B 10/616; H04B 10/07953; H04B 10/6161; H04B 10/6162;
(Continued)

(56) References Cited

U.S. PATENT DOCUMENTS 6,266,457 B1 * 7/2001 Jacob ................. G02B 6/29394
385/11
7,245,638 B2 * 7/2007 Agazzi .............. H04L 25/03006
375/327
(Continued)

FOREIGN PATENT DOCUMENTS

KR 10-2012-0029618 A 3/2012
KR 10-2013-0116452 A 10/2013

OTHER PUBLICATIONS

Nebendahl et al, EVM Tutorial, Oct. 2021, IEEE, All Document. https://ieee802.org/3/cw/public/tf_interim/21_1025/lecheminant_3cw_01_211025.pdf (Year: 2021).*

*Primary Examiner* — Dibson J Sanchez
(74) *Attorney, Agent, or Firm* — LRK PATENT LAW FIRM (57) ABSTRACT

Provided are a method and an apparatus for optimizing the performance of an optical transceiver, and the gist is as follows: receiving an optical input and converting the optical input into electrical signals; receiving a performance value and a reference clock of the electrical signals from a DSP part; generating a plurality of clocks by using the reference clock; determining ADC sampling timings of a plurality of ADCs on the basis of phases of the plurality of clocks applied to the plurality of ADCs; and compensating, on the basis of the determined ADC sampling timings, for differences in physical length between output signals of the plurality of ADCs.

16 Claims, 11 Drawing Sheets

(51) Int. Cl.
*H04L 7/02* (2006.01)
*H04B 10/07* (2013.01)
*H04B 10/079* (2013.01)
*H04B 10/60* (2013.01)
*H04B 10/61* (2013.01)

(52) U.S. Cl.
CPC ........ *H04B 10/07953* (2013.01); *H04B 10/60* (2013.01); *H04B 10/616* (2013.01)

(58) Field of Classification Search
CPC ....... H04B 10/07; H04B 10/60; H04L 7/0016; H04L 7/02; H04L 7/0041
USPC ........................ 398/9–38, 135–139, 202–214
See application file for complete search history.

(56) References Cited

U.S. PATENT DOCUMENTS

| | | | |
|---|---|---|---|
| 7,315,575 B2 | 1/2008 | Sun et al. | |
| 7,555,227 B2 | 6/2009 | Bontu et al. | |
| 7,769,305 B1* | 8/2010 | Roberts | H04L 7/0075 398/208 |
| 9,240,843 B1* | 1/2016 | Malouin | H04B 10/616 |
| 9,337,934 B1 | 5/2016 | Agazzi et al. | |
| 9,882,724 B2 | 1/2018 | Hyun et al. | |
| 9,906,243 B1* | 2/2018 | Arabaci | H03M 13/353 |
| 10,985,900 B1* | 4/2021 | Abdo | H04L 7/027 |
| 2011/0229127 A1* | 9/2011 | Sakamoto | H04B 10/6165 398/25 |
| 2012/0121274 A1* | 5/2012 | Fludger | H04B 10/614 398/208 |
| 2012/0213510 A1* | 8/2012 | Stojanovic | H04B 10/6165 398/25 |
| 2012/0219302 A1* | 8/2012 | Sun | H04L 7/027 398/208 |
| 2012/0308227 A1* | 12/2012 | Komaki | H04B 10/25073 398/25 |
| 2013/0039665 A1* | 2/2013 | Hauske | H04L 7/027 398/202 |
| 2014/0029959 A1* | 1/2014 | Koizumi | H04L 27/0014 398/208 |
| 2014/0105616 A1* | 4/2014 | Yan | H04L 7/0029 398/208 |
| 2015/0147071 A1* | 5/2015 | Kawasoe | H04B 10/6165 398/202 |
| 2015/0171972 A1* | 6/2015 | Xie | H04B 10/6161 398/208 |
| 2018/0019877 A1 | 1/2018 | Koo | |
| 2018/0102839 A1* | 4/2018 | Wang | H04L 5/0053 |
| 2020/0052795 A1* | 2/2020 | Morie | H04B 10/07951 |
| 2020/0374011 A1* | 11/2020 | Zhou | H04B 10/6162 |

* cited by examiner

Changes in ADC sampling timing(psec)

METHOD AND APPARATUS FOR OPTIMIZING PERFORMANCE OF OPTICAL TRANSCEIVER

CROSS REFERENCE TO RELATED APPLICATION

The present application claims priority to Korean Patent Application No. 10-2022-0032351, filed Mar. 15, 2022, the entire content of which is incorporated herein for all purposes by this reference.

BACKGROUND OF THE INVENTION

1. Field of the Invention

The present disclosure relates to a method and an apparatus for optimizing the performance of an optical transceiver. More particularly, the present disclosure relates to a technology related to a method and an apparatus for optimizing the performance of an optical transceiver that transmits high capacity signals over an optical network.

2. Description of Related Art

Coherent optical communication technology has attempted to implement a technology, such as an optical phase-locked loop (PLL) or an optical polarization controller, in an optical method to control phase and polarization of the optical signal in a coherent optical receiver, but usefulness and practicality are low.

Recently, with the development of integrated circuits and digital signal processing (hereinafter, referred to as DSP) technology, ASICs for coherent optical communication has been developed and groundbreaking technological advancements have been achieved. In addition, the development of miniaturization and integration technology of optical devices has greatly developed coherent optical transceivers. Due to these technological developments, coherent optical transceivers are used in various optical networks, such as long-distance and metro accesses, and are expected to be used for short-distance optical transmission within data centers in the long term.

In the related art, a training signal needs to be determined in advance and built in a DSP part, and this results in complicated installation of an optical transceiver and long installation time and creates user inconvenience.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a method and an apparatus for optimizing the performance of an optical transceiver, the method and the apparatus being capable of achieving optimal performance when high capacity signals are transmitted over an optical network.

The present disclosure is directed to providing a method and an apparatus for optimizing the performance of an optical transceiver, wherein when the optical transceiver shows a great difference in reception performance because of differences in physical length or differences in sampling phase between four signals connecting an optical receiver and four different ADCs, the method and the apparatus compensate for the great difference.

Other objectives and advantages of the present disclosure will be understood from the following descriptions and become apparent by the embodiments of the present disclosure. Also, it is understood that the objectives and advantages of the present disclosure may be implemented by means defined in the appended claims or their combinations.

According to an embodiment of the present disclosure, there is provided a method for optimizing performance of an optical transceiver, the method including: receiving an optical input and converting the optical input into electrical signals; receiving a performance value and a reference clock of the electrical signals from a DSP part; generating a plurality of clocks by using the reference clock; determining ADC sampling timings of a plurality of ADCs on the basis of phases of the plurality of clocks applied to the plurality of ADCs; and compensating, on the basis of the determined ADC sampling timings, for differences in physical length between output signals of the plurality of ADCs.

According to an embodiment of the present disclosure, in the method for optimizing the performance of the optical transceiver, performance of the electrical signals may be estimated using either bit error rate or error vector magnitude.

According to an embodiment of the present disclosure, in the method for optimizing the performance of the optical transceiver, the receiving of the performance value and the reference clock of the electrical signals from the DSP part may include periodically receiving the performance value of the electrical signals.

According to an embodiment of the present disclosure, in the method for optimizing the performance of the optical transceiver, the plurality of clocks may have different phase values.

According to an embodiment of the present disclosure, in the method for optimizing the performance of the optical transceiver, the ADC sampling timings may have different values because of differences between the different phase values.

According to an embodiment of the present disclosure, in the method for optimizing the performance of the optical transceiver, the DSP part may use a frequency domain FIR filter to perform separation of polarization of the optical input.

According to an embodiment of the present disclosure, the method for optimizing the performance of the optical transceiver may further include compensating, on the basis of the determined ADC sampling timings, for the differences in physical length between the output signals of the plurality of ADCs by using clock phase control.

According to an embodiment of the present disclosure, the method for optimizing the performance of the optical transceiver may further include compensating, on the basis of the determined ADC sampling timings, for the differences in physical length between the output signals of the plurality of ADCs by changing the phases of the clocks sequentially.

According to an embodiment of the present disclosure, the method for optimizing the performance of the optical transceiver may further include acquiring, in a state in which excluding a first electrical signal path among electrical signal paths of the ADCs, the remaining electrical signal paths are optimized, the ADC sampling timings by changing the first electrical signal path.

According to an embodiment of the present disclosure, the method for optimizing the performance of the optical transceiver may be manufactured as an ASIC to include the DSP part, a DAC part, and an ADC part.

According to an embodiment of the present disclosure, there is provided an apparatus for optimizing performance of an optical transceiver, the apparatus including: an optical receiver configured to receive an optical input and convert the optical input into electrical signals; a performance monitoring part configured to receive a performance value and a reference clock of the electrical signals from a DSP part 419; and a clock phase controller configured to generate a plurality of clocks by using the reference clock, determine ADC sampling timings of a plurality of ADCs on the basis of phases of the plurality of clocks applied to the plurality of ADCs, and compensate, on the basis of the determined ADC sampling timings, for differences in physical length between output signals of the plurality of ADCs.

According to an embodiment of the present disclosure, in the apparatus for optimizing the performance of the optical transceiver, performance of the electrical signals may be estimated using either bit error rate or error vector magnitude.

According to an embodiment of the present disclosure, in the apparatus for optimizing the performance of the optical transceiver, the performance monitoring part may be configured to periodically receive the performance value of the electrical signals.

According to an embodiment of the present disclosure, in the apparatus for optimizing the performance of the optical transceiver, the plurality of clocks may have different phase values.

According to an embodiment of the present disclosure, in the apparatus for optimizing the performance of the optical transceiver, the ADC sampling timings may have different values because of differences between the different phase values.

According to an embodiment of the present disclosure, in the apparatus for optimizing the performance of the optical transceiver, the DSP part may be configured to use a frequency domain FIR filter to perform separation of polarization of the optical input.

According to an embodiment of the present disclosure, in the apparatus for optimizing the performance of the optical transceiver, the clock phase controller may be configured to compensate, on the basis of the determined ADC sampling timings, for the differences in physical length between the output signals of the plurality of ADCs by using clock phase control.

According to an embodiment of the present disclosure, in the apparatus for optimizing the performance of the optical transceiver, the clock phase controller may be configured to compensate, on the basis of the determined ADC sampling timings, for the differences in physical length between the output signals of the plurality of ADCs by changing the phases of the clocks sequentially.

According to an embodiment of the present disclosure, in the apparatus for optimizing the performance of the optical transceiver, the clock phase controller may be configured to acquire, in a state in which excluding a first electrical signal path among electrical signal paths of the ADCs, the remaining electrical signal paths are optimized, the ADC sampling timings by changing the first electrical signal path.

According to an embodiment of the present disclosure, there is provided an apparatus for optimizing performance of an optical transceiver, the apparatus including: the transceiver configured to transmit and receive optical signal; and a processor configured to receive an optical input and convert the optical input into electrical signals, receive a performance value and a reference clock of the electrical signals from a DSP part, generate a plurality of clocks by using the reference clock, determine ADC sampling timings of a plurality of ADCs on the basis of phases of the plurality of clocks applied to the plurality of ADCs, and compensate, on the basis of the determined ADC sampling timings, for differences in physical length between output signals of the plurality of ADCs.

According to an embodiment of the present disclosure, when the optical transceiver shows a great difference in reception performance because of differences in physical length or differences in sampling phase between the four signals connecting the optical receiver and the four different ADCs, the great difference can be compensated for, thereby improving user convenience.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, exemplary embodiments of the present disclosure will be described in detail with reference to the accompanying drawings such that the present disclosure can be easily embodied by those skilled in the art to which this present disclosure belongs. However, the present disclosure may be embodied in various different forms and should not be limited to the embodiments set forth herein.

In describing the embodiments of the present disclosure, if it is decided that a detailed description of known function or configuration related to the disclosure makes the subject matter of the disclosure unclear, the detailed description is omitted. Also, parts that are not related to the description of the present disclosure are omitted in the drawings, and like reference numerals designate like parts.

In the present disclosure, elements that are distinguished from each other to clearly describe each feature do not necessarily denote that the elements are separated. That is, a plurality of elements may be integrated into one hardware or software unit, or one element may be distributed into a plurality of hardware or software units. Accordingly, even if not mentioned, the integrated or distributed embodiments are included in the scope of the present disclosure.

In the present disclosure, elements described in various embodiments do not denote essential elements, and some of the elements may be optional. Accordingly, an embodiment that includes a subset of elements described in another embodiment is included in the scope of the present disclosure. Also, an embodiment that includes elements which are described in the various embodiments and additional other elements is also included in the scope of the present disclosure.

In the present disclosure, elements described in various embodiments do not denote essential elements, and some of the elements may be optional. Accordingly, an embodiment that includes a subset of elements described in another embodiment is included in the scope of the present disclosure. Also, an embodiment that includes elements which are described in the various embodiments and additional other elements is also included in the scope of the present disclosure.

In the present disclosure, the terms "first", "second", etc. are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

In addition, in the present disclosure, a description of each drawing may be applied to different drawings unless one drawing showing an embodiment of the present disclosure corresponds to an alternative embodiment.

Hereinafter, the present disclosure will be described in more detail with reference to the accompanying drawings.

Figure 1:
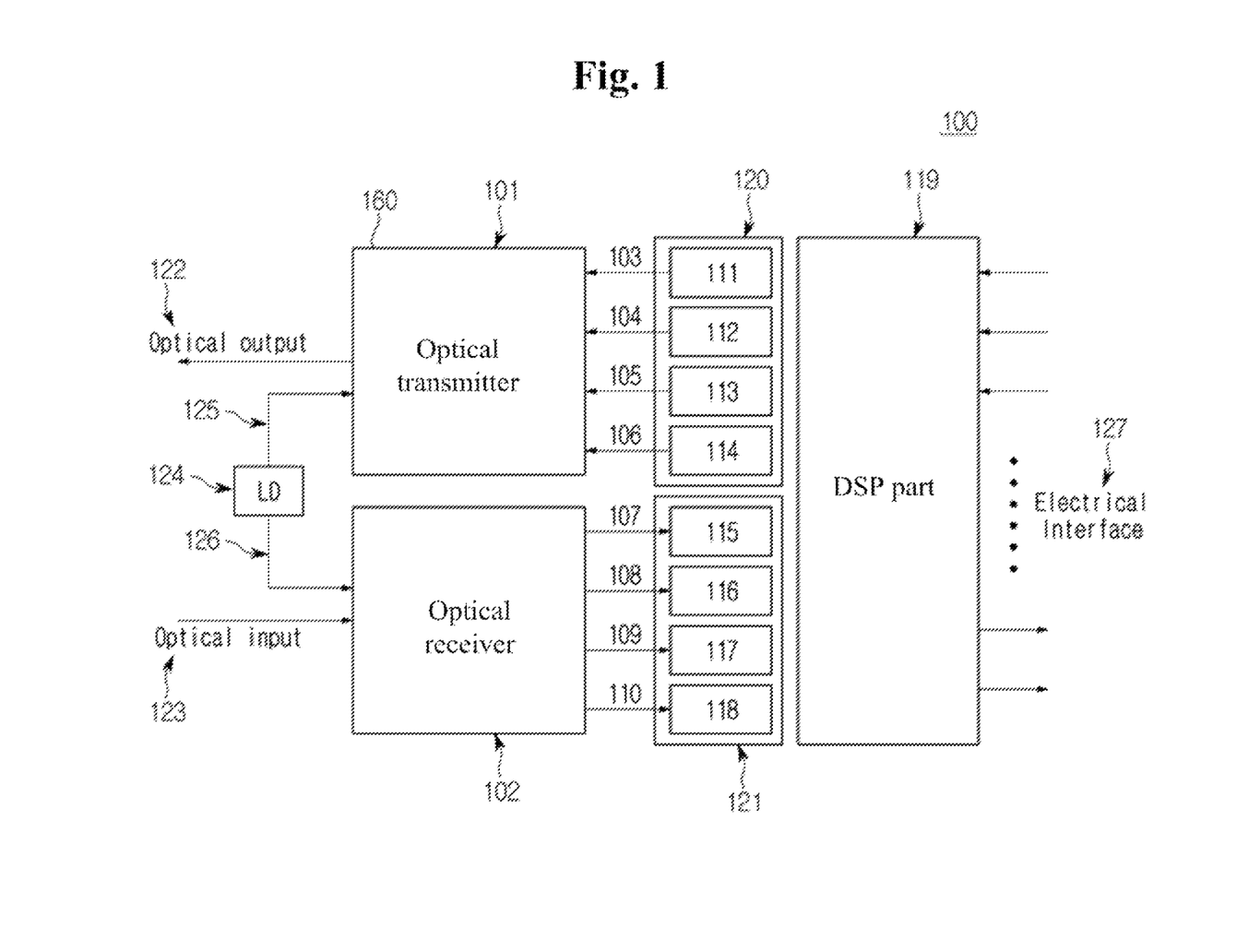
FIG. 1 is a diagram illustrating a configuration of an apparatus for optimizing the performance of an optical transceiver, according to an embodiment of the present disclosure.

FIG. 1 is a diagram illustrating a configuration of an apparatus for optimizing the performance of an optical transceiver, according to an embodiment of the present disclosure.

Referring to FIG. 1, an apparatus 100 for optimizing the performance of an optical transceiver includes an optical transmitter 101, an optical receiver 102, a DSP part 119, a DAC part 120, and an ADC part 121.

The optical transmitter 101 may include an optical modulator, and a modulator driver amplifier.

The optical transmitter 101 uses the optical modulator in the optical transmitter 101 to modulate an output 125 of a light source (laser diode, LD) 124 and outputs optical signal 122.

The optical receiver 102 includes an optical hybrid mixer, a photodetector (photo-diode), and a transimpedance amplifier (TIA).

The optical receiver 102 receives an optical input 123 and converts the same into electrical signals.

An output 126 of the light source 124 is input to the optical receiver 102 and is mixed with a signal input of the optical input 123 while serving as a local oscillator (LO).

The apparatus 100 for optimizing the performance of the optical transceiver uses the x-polarization and the y-polarization of the light source and performs modulation and demodulation with respect to an I-signal (in-phase) and a Q-signal (quadrature) each, so that four electrical signals x-I, x-Q, y-I, and y-Q are used.

Herein, as a modulation format, various modulations, such as QPSK, 16-QAM, 32-QAM, 64-QAM, etc., may be possible.

A signal intended to be transmitted is transmitted to the apparatus 100 for optimizing the performance of the optical transceiver through an electrical interface 127, and the digital signal processing part (hereinafter, referred to as the DSP part) 119 performs signal formation and recovery.

The digital-to-analog converter part (hereinafter, referred to as the DAC part) 120 includes a first DAC 111, a second DAC 112, a third DAC 113, and a fourth DAC 114. The DAC part 120 converts digital signals into analog signals.

The four DACs transmit signals, a third signal 103, a fourth signal 104, a fifth signal 105, and a sixth signal 106, to the optical transmitter 101.

The analog-to-digital converter part (hereinafter, referred to as the ADC part) 121 includes a first ADC 115, a second ADC 116, a third ADC 117, and a fourth ADC 118. The ADC part 120 converts analog signals into digital signals.

Signals received by the optical receiver 102 are four signals, a seventh signal 107, an eighth signal 108, a ninth signal 109, and a 10th signal 110, and are transmitted to the ADC part 121 and converted into digital signals.

The optical transceiver 100 may be manufactured as an ASIC to include the DSP part 119, the DAC part 120, and the ADC part 121.

In the case of the DSP part 119, various digital signal processing techniques may be applied. Impairments, such as chromatic dispersion and polarization mode dispersion, occurring in optical lines may be compensated for by using a DSP algorithm. In addition, frequency offset and phase noise of an optical signal may be estimated. Modulation format formation and demodulation functions are also performed in the DSP part 119.

Figure 2:
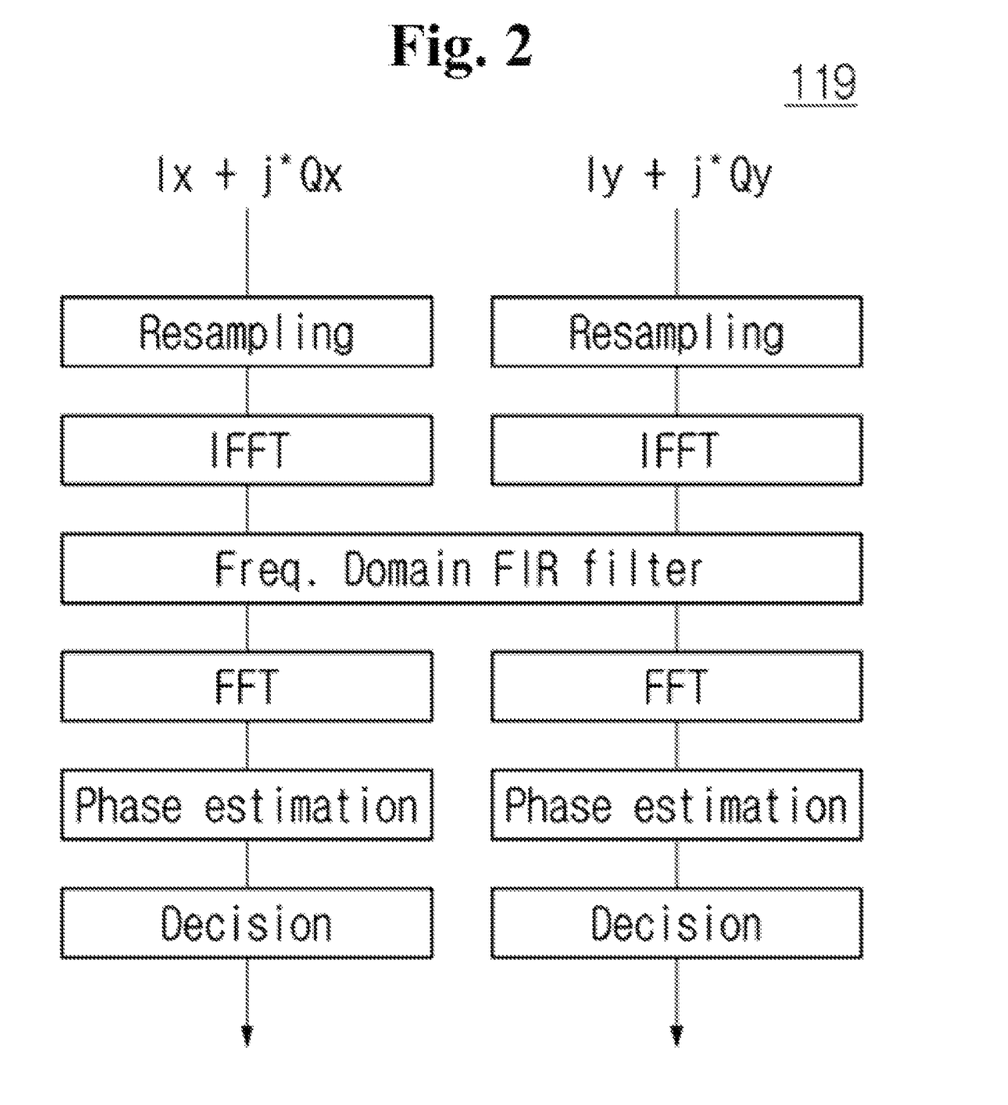
FIG. 2 is a flowchart illustrating a signal processing method of a DSP part, according to an embodiment of the present disclosure.

FIG. 2 is a flowchart illustrating a signal processing method of a DSP part, according to an embodiment of the present disclosure.

Referring to FIG. 2, an example of the DSP part 119 will be described.

A frequency domain FIR filter is used, and signal equalization and separation of polarization are performed using the frequency domain FIR filter.

Compensation for chromatic dispersion and polarization mode dispersion is made. After phase estimation of a signal is performed, the signal is recovered according to decision.

Figure 3:
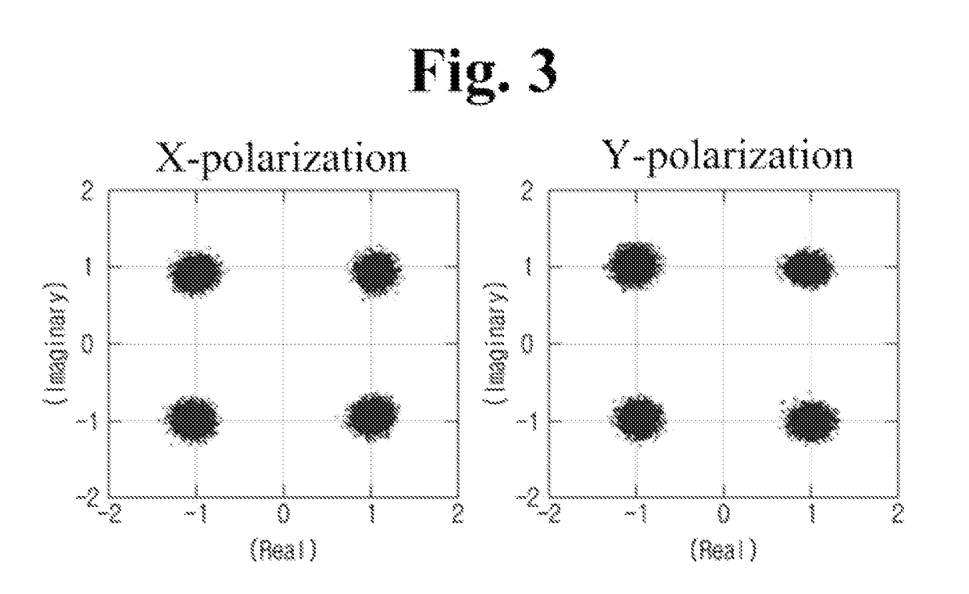
FIG. 3 is a diagram illustrating QPSK signals received and recovered by an optical transceiver, according to an embodiment of the present disclosure.

FIG. 3 is a diagram illustrating QPSK signals received and recovered by an apparatus for optimizing the performance of an optical transceiver, according to an embodiment of the present disclosure.

Referring to FIG. 3, the optical transceiver may show a great difference in reception performance because of differences in physical length or differences in sampling phase between the seventh signal 107, the eighth signal 108, the ninth signal 109, and the 10th signal 110 connecting the optical receiver 102 and the ADC part 121 of FIG. 1. This problem is called skew, and a method of compensating for skew is required. Similarly, skew between the four signals between the optical transmitter 101 and the DAC part 120 also affects reception performance.

In the related art, a training signal needs to be determined in advance and built in the DSP part, and this results in complicated installation of the optical receiver and long installation time.

Figure 4:
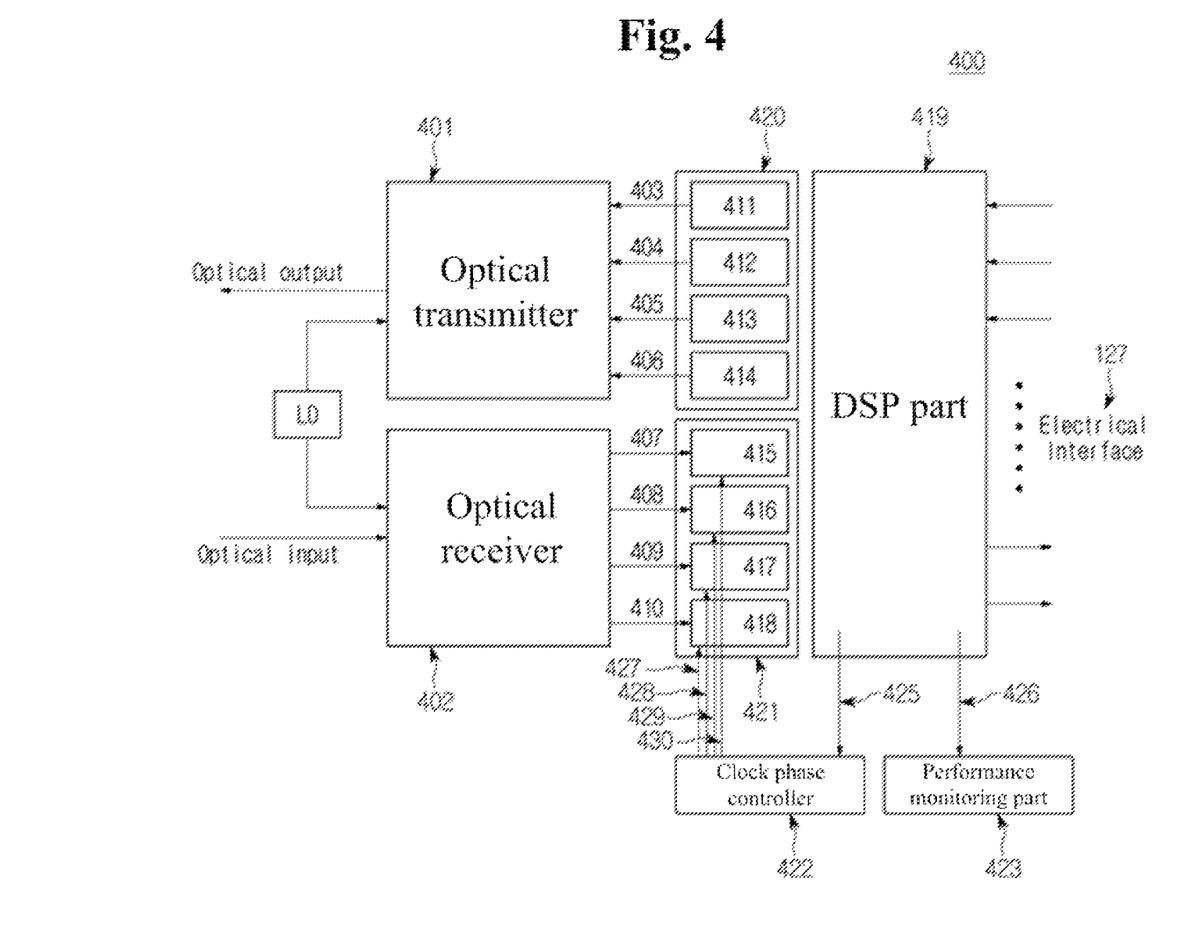
FIG. 4 is a diagram illustrating a configuration of a coherent optical receiver, according to an embodiment of the present disclosure.

FIG. 4 is a diagram illustrating a configuration of an apparatus for optimizing the performance of an optical transceiver, according to an embodiment of the present disclosure.

Referring to FIG. 4, the performance of electrical signals may be calculated from signals recovered by a DSP part 419.

The performance of the electrical signals may be estimated with the bit error rate (hereinafter, referred to as BER) or the error vector magnitude (EVM).

A performance monitoring part 423 may receive a performance value 426 of the electrical signals from the DSP part 419. The performance monitoring part 423 periodically receives the performance value 426 of the electrical signals.

A clock phase controller 422 optimizes the performance value 426 of the signals.

The clock phase controller 422 may receive a reference clock 425 from the DSP part 419.

A clock phase controller 422 may use the reference clock 425 to generate a seventh clock 427, an eighth clock 428, a ninth clock 429, and a 10th clock 430.

The seventh clock 427 to the 10th clock 430 have different phase values. The differences in the phase values make the ADC sampling timings of a first ADC 415, a second ADC 416, a third ADC 417, and a fourth ADC 418 different.

That is, the ADC sampling timings of the first ADC 415 to the fourth ADC 418 are determined by the clock phases of the seventh clock 427 to the 10th clock 430 applied to the respective ADCs.

The determined ADC sampling timings may be used to compensate for differences in physical length between a seventh signal 407, an eighth signal 408, a ninth signal 409, and a 10th signal 410.

Figure 5:
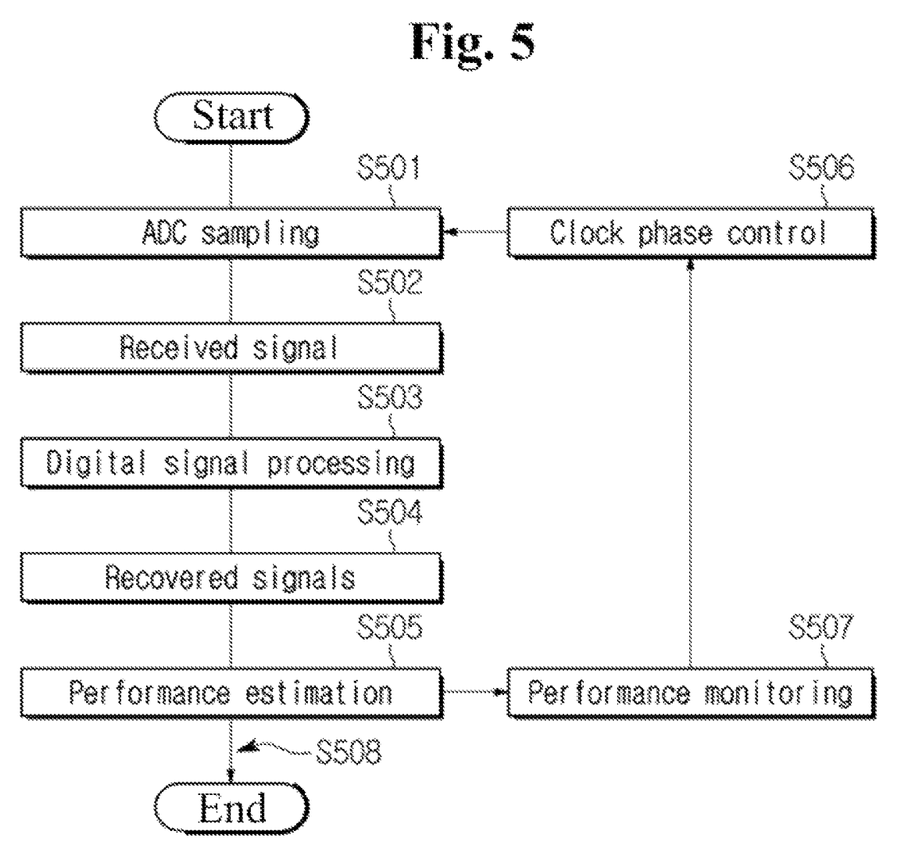
FIG. 5 is a flowchart illustrating a method for optimizing the performance of an optical transceiver, according to an embodiment of the present disclosure.

FIG. 5 is a flowchart illustrating a method for optimizing the performance of an optical transceiver, according to an embodiment of the present disclosure.

Each ADC sampling expressed as the first ADC 415, the second ADC 416, the third ADC 417, and the fourth ADC 418 is performed in step S501.

Received signals resulting from conversion are digitally expressed in step S502.

The received signals are subjected to a digital signal processing process in step S503.

The signals resulting from the DSP process are converted into recovered signals in step S504.

Performance estimation is performed on the recovered signals in step S505. Herein, the performance value of the signals may be estimated by calculating a value of the bit error rate (BER) or error vector magnitude (EVM) in step S505.

The performance value calculated in the performance estimation in step S505 is monitored in step S507.

On the basis of the monitored performance value, clock phase control is performed in step S506.

In step S506, respective clock phases corresponding to the seventh clock 427 to the 10th clock 430 of FIG. 4 are controlled. The DSP part 419 of FIG. 4 includes the functions of steps S502, S503, S504, and S505.

In addition, in a case in which the optical transceiver is manufactured as an ASIC, it may be manufactured including all functions of steps S501 to S508.

Figure 6A:
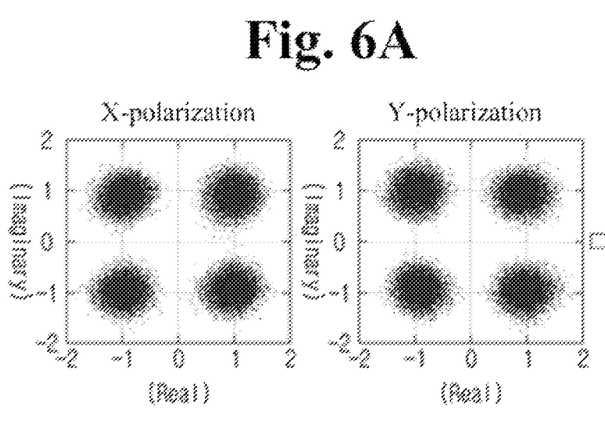
FIGS. 6A and 6B are diagrams illustrating an effect of the present disclosure, according to an embodiment of the present disclosure.
Figure 6B:
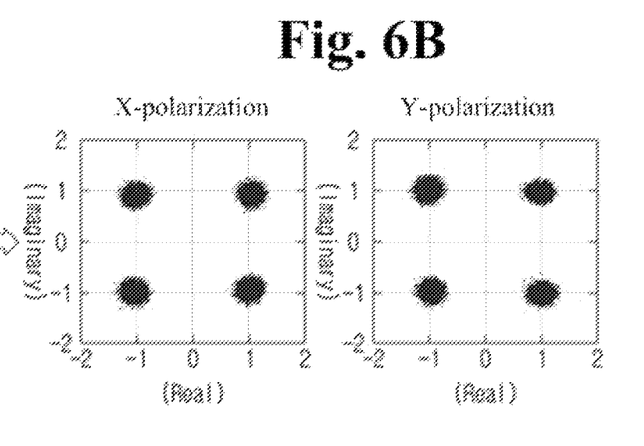

FIGS. 6A and 6B are diagrams illustrating an effect of the present disclosure, according to an embodiment of the present disclosure.

FIG. 6 includes FIG. 6A and FIG. 6B.

FIG. 6A is a diagram illustrating a problem in the related art.

FIG. 6B is a diagram illustrating that the problem in the related art is solved.

FIG. 6A shows a problem caused by differences in ADC sampling timing due to differences in length and differences in phase between the seventh signal 407, the eighth signal 408, the ninth signal 409, and the 10th signal 410 of FIG. 4. QPSK signal reception is possible for each of The two polarizations, but large EVM values are measured.

However, this is not a problem caused by other noise, but by the differences in physical length or the differences in phase between the seventh signal 407, the eighth signal 408, the ninth signal 409, and the 10th signal 410. By adjusting the ADC sampling timing in the manner described with reference to FIG. 5, much better performance as shown in FIG. 6B may be obtained.

Figure 7:
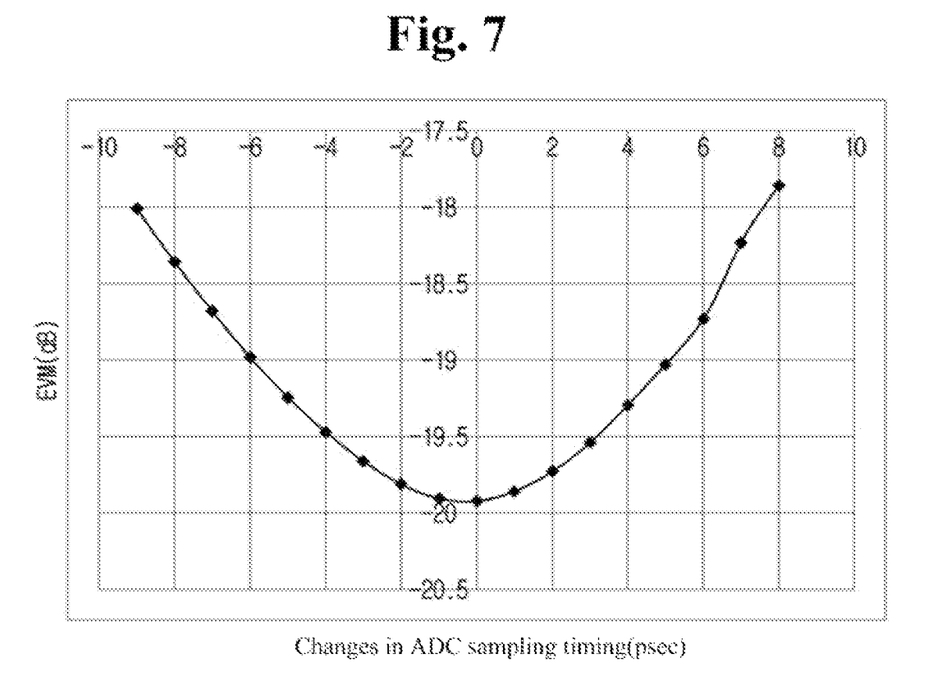
FIG. 7 is a diagram illustrating changes in ADC sampling timing, according to an embodiment of the present disclosure.

FIG. 7 is a diagram illustrating changes in ADC sampling timing, according to an embodiment of the present disclosure.

FIG. 7 shows the changes obtained by obtained by monitoring EVM performance.

FIG. 7 shows the performance changes obtained under the following condition: while three of four paths of the seventh signal 407, the eighth signal 408, the ninth signal 409, and the 10th signal 410 are optimized, the other one is changed.

It is found that there are significant changes in EVM and an optimal value exists. Clock phase control by the clock phase controller 422 is used to adjust the four ADC sampling timings. The clock phase controller 422 changes four clock phases sequentially and acquires clock phase values for optimizing performance.

Figure 8:
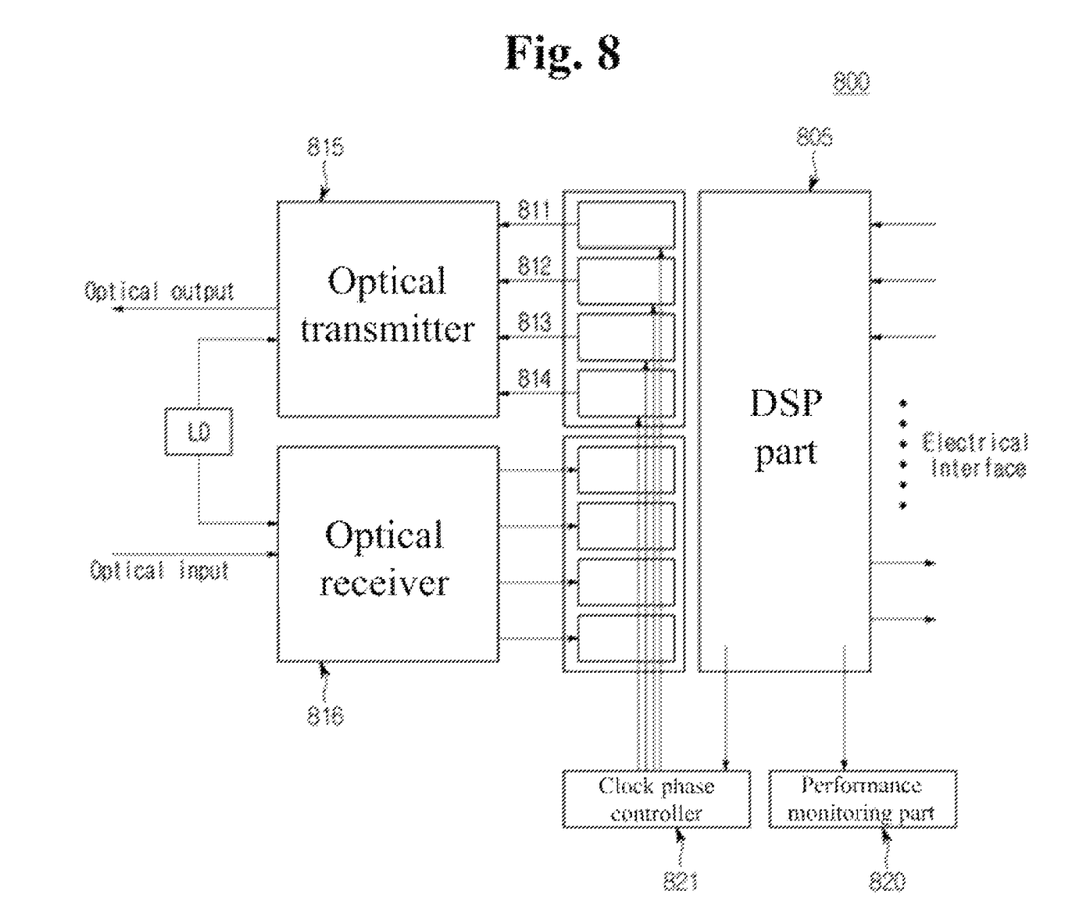
FIG. 8 is a diagram illustrating a configuration of an apparatus for optimizing the performance of an optical transceiver, according to an embodiment of the present disclosure.

FIG. 8 is a diagram illustrating a configuration of an apparatus for optimizing the performance of an optical transceiver, according to an embodiment of the present disclosure.

Referring to FIG. 8, an apparatus 800 for optimizing the performance of an optical transceiver includes an optical transmitter 815, a DSP part 805, an optical receiver 816, a clock phase controller 821, and a performance monitoring part 820.

A first DAC 801, a second DAC 802, a third DAC 803, and a fourth DAC 804 are DACs and convert digital signals generated by the DSP part 805 into analog signals and transmit the analog signals to the optical transmitter 815.

Specifically, the analog signals are transmitted to the optical transmitter 815 by a first signal 811, a second signal 812, a third signal 813, and a fourth signal 814.

Herein, differences in physical length between the first signal 811 to the fourth signal 814 or differences in sampling timing of the first DAC 801 to the fourth DAC 804 degrade transmission and reception performance.

The performance monitoring part 820 may periodically monitor performance and the clock phase controller 821 controls clock phases to optimize the performance of the optical transceiver.

Figure 9:
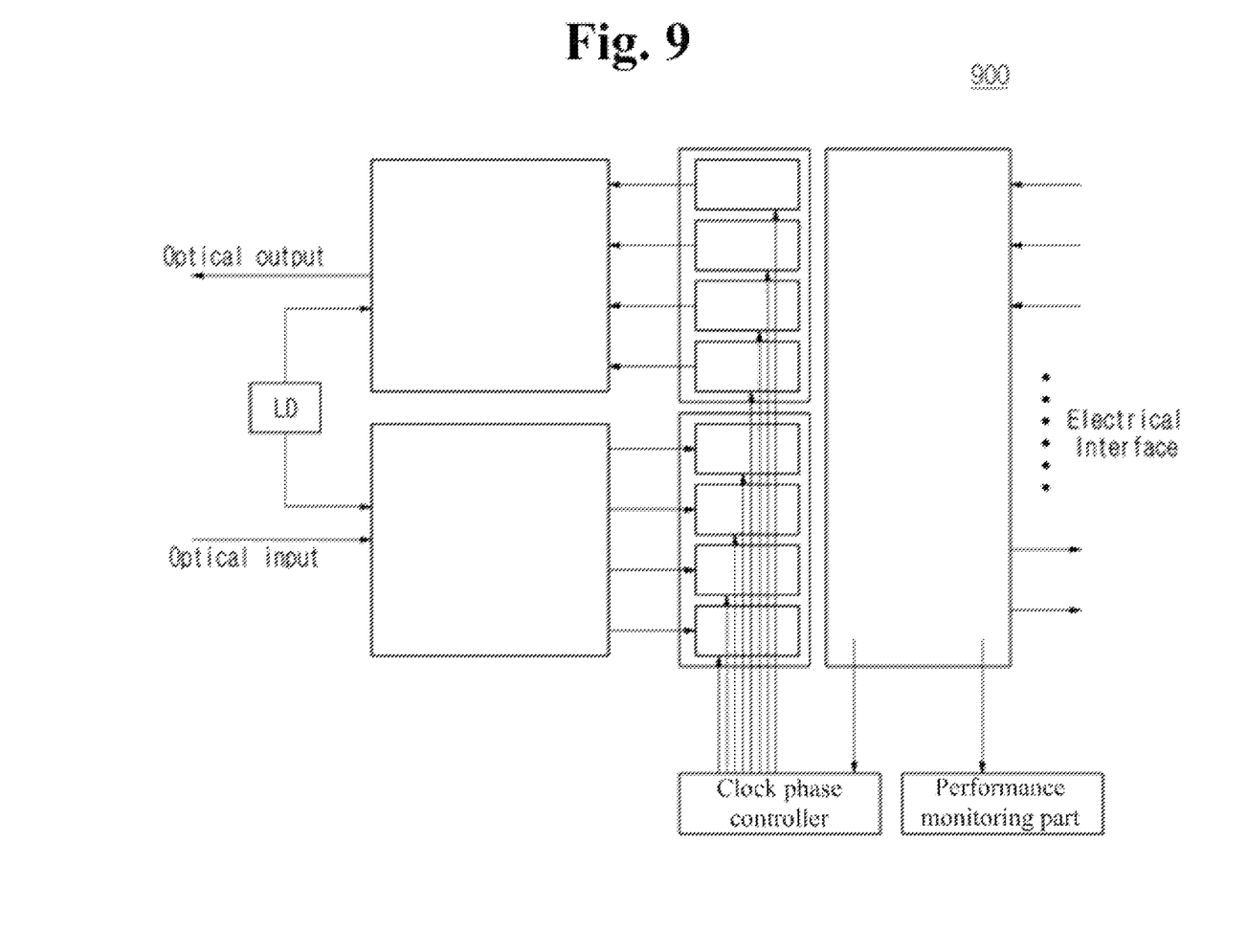
FIG. 9 is a diagram illustrating a configuration of an apparatus for optimizing the performance of an optical transceiver, according to an embodiment of the present disclosure.

FIG. 9 is a diagram illustrating a configuration of an apparatus for optimizing the performance of an optical transceiver, according to an embodiment of the present disclosure.

Referring to FIG. 9, an apparatus 900 for optimizing an optical transceiver performance may operate the functions of the embodiments of FIGS. 4 and 8 simultaneously.

Figure 10:
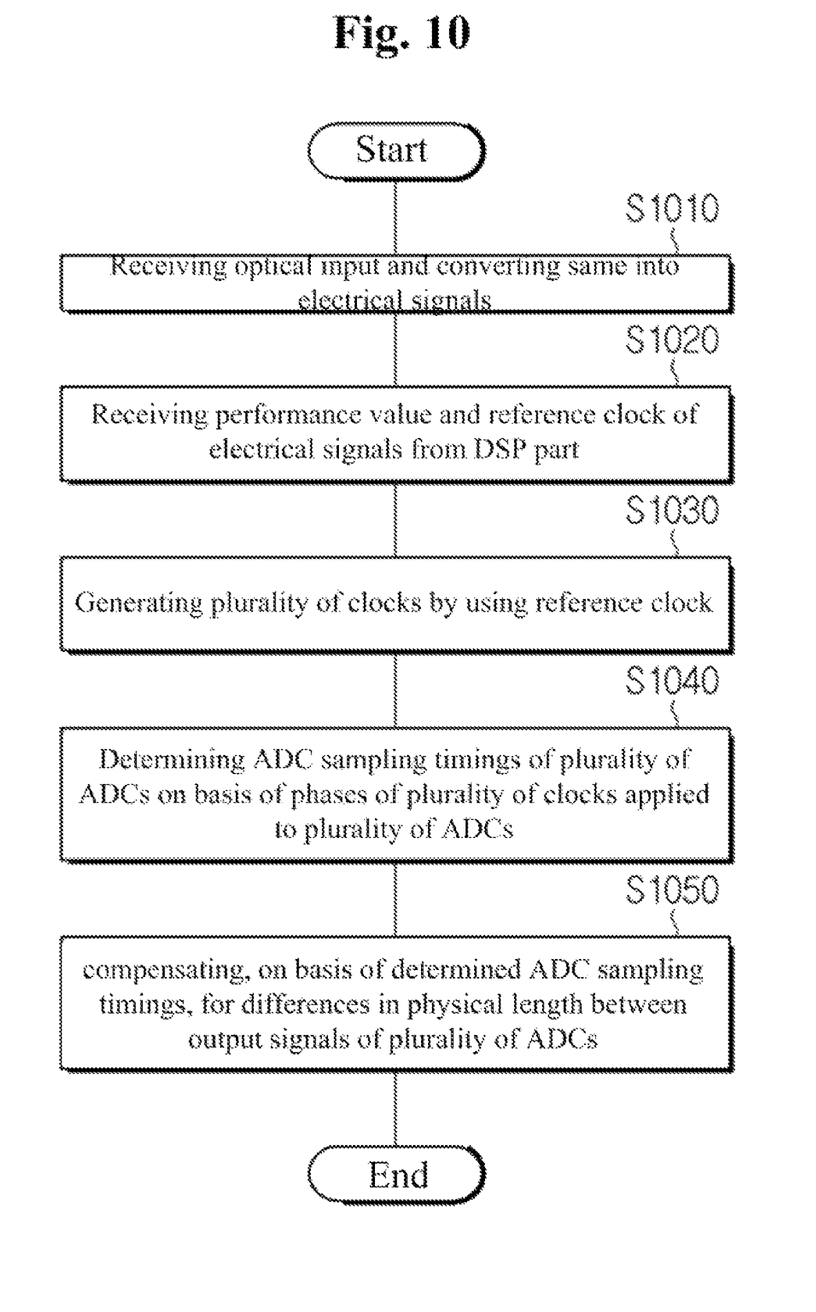
FIG. 10 is a flowchart illustrating a method for optimizing the performance of an optical transceiver, according to an embodiment of the present disclosure.

FIG. 10 is a flowchart illustrating a method for optimizing the performance of an optical transceiver, according to an embodiment of the present disclosure. The present disclosure is performed by an apparatus for optimizing the performance of an optical transceiver.

An optical input is received and converted into electrical signals in step S1010.

A performance value and a reference clock of the electrical signals are received from a DSP part in step S1020.

The reference clock is used to generate a plurality of clocks in step S1030.

ADC sampling timings of a plurality of ADCs are determined on the basis of phases of the plurality of clocks applied to the plurality of ADCs in step S1040.

On the basis of the determined ADC sampling timings, differences in physical length to between output signals of the plurality of ADCs are compensated for in step S1050.

Figure 11:
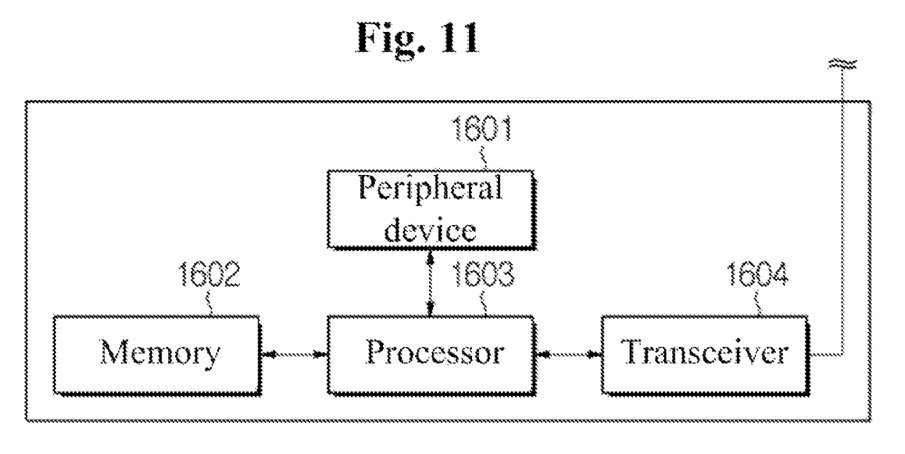
FIG. 11 is a diagram illustrating a configuration of an apparatus for optimizing the performance of an optical transceiver, according to an embodiment of the present disclosure.

FIG. 11 is a diagram illustrating a configuration of an apparatus for optimizing the performance of an optical transceiver, according to an embodiment of the present disclosure.

Referring to FIG. 11, the apparatus for optimizing the performance of the optical transceiver includes a device 1600. The device 1600 may include a memory 1602, a processor 1603, a transceiver 1604, and a peripheral device 1601. In addition, for example, the device 1600 may further include other elements, and is not limited to the above-described embodiment. Herein, for example, the device may be a device that operates on the basis of the above-described apparatus for optimizing the performance of the optical transceiver.

More specifically, the device 1600 of FIG. 11 may be an apparatus for optimizing the performance of the optical transceiver and an illustrative hardware/software architecture. Herein, for example, the memory 1602 may be a non-removable memory or a removable memory. In addition, for example, the peripheral device 1601 may include a display, a GPS device, or other peripherals, and is not limited to the above-described embodiment.

In addition, for example, like the transceiver 1604, the device 1600 may include a communication circuit, and may use the circuit to perform communication with external devices.

In addition, for example, the processor 1603 may be at least one selected from a group of a general-purpose processor, a digital signal processor (DSP), a DSP core, a controller, a micro controller, application-specific integrated circuits (ASICs), field-programmable gate array (FPGA) circuits, any other types of integrated circuits (ICs), and one or more microprocessors related to a state machine. That is, the processor may be a hardware/software configuration performing a controlling role for controlling the device 1600.

Herein, the processor 1603 may execute computer-executable commands stored in the memory 1602 in order to perform various essential functions of the apparatus for optimizing the performance of the optical transceiver. For example, the processor 1603 may control at least one selected from a group of signal coding, data processing, power controlling, input and output processing, and communication operations. In addition, the processor 1603 may control a physical layer, a MAC layer, and an application layer. In addition, for example, the processor 1603 may perform an authentication and security process in an access layer and/or an application layer, but is not limited to the above-described embodiment.

For example, the processor 1603 may perform communication with other devices through the transceiver 1604. For example, the processor 1603 may execute computer-executable commands so that the apparatus for optimizing the performance of the optical transceiver may be controlled to perform communication with external devices over a network. That is, communication performed in the present disclosure may be controlled. For example, the transceiver 1604 may transmit RF signals through an antenna, and may transmit signals on the basis of various communication networks.

In addition, for example, MIMO technology and beamforming technology may be applied as antenna technology, but no limitation to the above-described embodiment is imposed. In addition, a signal transmitted and received through the transceiver 1604 may be controlled by the processor 1603 by being modulated and demodulated, and is not limited to the above-described embodiment.

The various embodiments of the present disclosure are not intended to list all possible combinations, but to illustrate representative aspects of the present disclosure. The matters described in the various embodiments may be applied independently or in a combination of two or more.

Further, the various embodiments of the present disclosure may be implemented by hardware, firmware, software, or combinations thereof. In the case of implementation by hardware, implementation is possible by one or more application-specific integrated circuits (ASICs), digital signal processors (DSPs), digital signal processing devices (DSPDs), programmable logic devices (PLDs), field-programmable gate arrays (FPGAs), general processors, controllers, micro controllers, micro processors, and the like. For example, it is obvious that the various embodiments of the present disclosure may be implemented in the form of a program stored in a non-transitory computer-readable medium that may be used at a terminal or an edge, or may be implemented in to the form of a program stored in a non-transitory computer-readable medium that may be used at an edge or a cloud. In addition, the various embodiments of the present disclosure may be implemented by a combination of various types of hardware and software.

The scope of the present disclosure includes software or machine-executable instructions (for example, an operating system, an application, firmware, a program, and the like) that cause operation according to the methods of the various embodiments to be performed on a device or a computer, and includes a non-transitory computer-readable medium storing such software or instructions to execute on a device or a computer.

Various substitutions, modifications, and changes from the spirit of the present disclosure defined in the following claims by those skilled in the art are also included in the scope of the present disclosure, so that the present disclosure described above is not limited to the embodiments and the accompanying drawings.

What is claimed is:

1. A method for optimizing performance of an optical transceiver, the method comprising:
   receiving an optical input and converting the optical input into electrical signals;
   receiving a performance value and a reference clock of the electrical signals from a DSP (digital signal processing) part;
   generating a plurality of clocks by using the reference clock;
   determining ADC (analog-to-digital converter) sampling timings of a plurality of ADCs on the basis of phases of the plurality of clocks applied to the plurality of ADCs; and
   compensating, on the basis of the determined ADC sampling timings, for differences in physical length between output signals of the plurality of ADCs,
   wherein the plurality of clocks include a first clock, a second clock, a third clock, and a fourth clock, each having a different phase,
   wherein the output signals include a first signal, a second signal, a third signal, and a fourth signal,
   wherein the compensating comprises sequentially varying the phases of the first clock, the second clock, the third clock, and the fourth clock to compensate for differences in physical length of the first signal, the second signal, the third signal, and the fourth signal, and
   wherein performance of the electrical signals is estimated using bit error rate.

2. The method of claim 1, wherein the receiving of the performance value and the reference clock of the electrical signals from the DSP part comprises periodically receiving the performance value of the electrical signals.

3. The method of claim 1, wherein the plurality of clocks have different phase values.

4. The method of claim 3, wherein the ADC sampling timings have different values because of differences between the different phase values.

5. The method of claim 1, wherein the DSP part uses a frequency domain FIR filter to perform separation of polarization of the optical input.

6. The method of claim 1, further comprising
   compensating, on the basis of the determined ADC sampling timings, for the differences in physical length between the output signals of the plurality of ADCs by using clock phase control.

7. The method of claim 1, further comprising
   compensating, on the basis of the determined ADC sampling timings, for the differences in physical length between the output signals of the plurality of ADCs by changing the phases of the clocks sequentially.

8. The method of claim 1, wherein the method for optimizing the performance of the optical transceiver is manufactured as an ASIC (application-specific integrated circuit) to include the DSP part, a DAC (digital-to-analog converter) part, and an ADC part.

9. An apparatus for optimizing performance of an optical transceiver, the apparatus comprising:
   an optical receiver configured to receive an optical input and convert the optical input into electrical signals;
   a performance monitoring part configured to receive a performance value and a reference clock of the electrical signals from a DSP (digital signal processing) part; and
   a clock phase controller configured to:
      generate a plurality of clocks by using the reference clock,
      determine ADC (analog-to-digital converter) sampling timings of a plurality of ADCs on the basis of phases of the plurality of clocks applied to the plurality of ADCs, and
      compensate, on the basis of the determined ADC sampling timings, for differences in physical length between output signals of the plurality of ADCs,
   wherein the plurality of clocks include a first clock, a second clock, a third clock, and a fourth clock, each having a different phase,
   wherein the output signals include a first signal, a second signal, a third signal, and a fourth signal,
   wherein the clock phase controller is configured to sequentially vary the phases of the first clock, the second clock, the third clock, and the fourth clock to compensate for differences in physical length of the first signal, the second signal, the third signal, and the fourth signal, and
   wherein performance of the electrical signals is estimated using bit error rate.

10. The apparatus of claim 9, wherein the performance monitoring part is configured to periodically receive the performance value of the electrical signals.

11. The apparatus of claim 9, wherein the plurality of clocks have different phase values.

12. The apparatus of claim 11, wherein the ADC sampling timings have different values because of differences between the different phase values.

13. The apparatus of claim 9, wherein the DSP part is configured to use a frequency domain FIR filter to perform separation of polarization of the optical input.

14. The apparatus of claim 9, wherein the clock phase controller is configured to compensate, on the basis of the determined ADC sampling timings, for the differences in physical length between the output signals of the plurality of ADCs by using clock phase control.

15. The apparatus of claim 9, wherein the clock phase controller is configured to compensate, on the basis of the determined ADC sampling timings, for the differences in physical length between the output signals of the plurality of ADCs by changing the phases of the clocks sequentially.

16. An apparatus for optimizing performance of an optical transceiver, the apparatus comprising:
   the transceiver configured to transmit and receive optical signal; and
   a processor configured to:
      receive an optical input and convert the optical input into electrical signals,
      receive a performance value and a reference clock of the electrical signals from a DSP (digital signal processing) part,
      generate a plurality of clocks by using the reference clock,
      determine ADC (analog-to-digital converter) sampling timings of a plurality of ADCs on the basis of phases of the plurality of clocks applied to the plurality of ADCs, and
      compensate, on the basis of the determined ADC sampling timings, for differences in physical length between output signals of the plurality of ADCs,
   wherein the plurality of clocks include a first clock, a second clock, a third clock, and a fourth clock, each having a different phase,
   wherein the output signals include a first signal, a second signal, a third signal, and a fourth signal,
   wherein the clock phase controller is configured to sequentially vary the phases of the first clock, the second clock, the third clock, and the fourth clock to compensate for differences in physical length of the first signal, the second signal, the third signal, and the fourth signal, and wherein performance of the electrical signals is estimated using bit error rate.

\* \* \* \* \*